(12) United States Patent
Ciesla et al.

(10) Patent No.: US 9,557,915 B2
(45) Date of Patent: Jan. 31, 2017

(54) DYNAMIC TACTILE INTERFACE

(71) Applicant: Tactus Technology, Inc., Fremont, CA (US)

(72) Inventors: Craig Ciesla, Fremont, CA (US); Micah Yairi, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 0 days.

(21) Appl. No.: 14/845,110

(22) Filed: Sep. 3, 2015

(65) Prior Publication Data

US 2016/0187982 A1 Jun. 30, 2016

Related U.S. Application Data

(60) Provisional application No. 62/045,145, filed on Sep. 3, 2014.

(51) Int. Cl.
*G06F 3/01* (2006.01)
*G06F 3/0488* (2013.01)

(52) U.S. Cl.
CPC . *G06F 3/04886* (2013.01); *G06F 2203/04809* (2013.01)

(58) Field of Classification Search
CPC .................. G06F 3/04886; G06F 2203/04809; G06F 3/016; G06F 2203/04105; G06F 3/041

See application file for complete search history.

(56) References Cited

U.S. PATENT DOCUMENTS 2,885,967 A 5/1959 Vogel et al.
3,034,628 A 5/1962 Wadey
(Continued)

FOREIGN PATENT DOCUMENTS

CN 1260525 A 7/2000
CN 1530818 A 9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Abbas Abdulselam
(74) *Attorney, Agent, or Firm* — Jeffrey Schox; Padowithz Alce

(57) ABSTRACT

A system that detects and transitions a configuration of a dynamic tactile interface coupled to a computing device incorporating a touchscreen. The dynamic tactile interface includes a tactile layer and a substrate, wherein the tactile layer defines a tactile surface, a deformable region, and a first region adjacent the deformable region and coupled to the substrate opposite the tactile surface. A variable volume fluidly coupled to a fluid channel and a displacement device that transitions the deformable region from a retracted setting into an expanded setting in response to actuation of an input actuator coupled to the displacement device. A sensor detects a change in a position of the input actuator. In response to the change in the position, the configuration of the deformable regions of the dynamic tactile interface is correlated to a rendered graphical user interface on the touchscreen.

24 Claims, 9 Drawing Sheets

(56) References Cited

U.S. PATENT DOCUMENTS

| | | | |
|---|---|---|---|
| 3,441,111 A | 4/1969 | Spalding | |
| 3,453,967 A | 7/1969 | Spurlock et al. | |
| 3,490,733 A | 1/1970 | Jean | |
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,181,476 A | 1/1980 | Malbec | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,743,895 A | 5/1988 | Alexander | |
| 4,772,205 A | 9/1988 | Chlumsky et al. | |
| 4,920,343 A | 4/1990 | Schwartz | |
| 4,940,734 A | 7/1990 | Ley et al. | |
| 4,980,646 A * | 12/1990 | Zemel | G01D 5/252 178/18.05 |
| 5,090,297 A | 2/1992 | Paynter | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,346,476 A | 9/1994 | Elson | |
| 5,369,228 A | 11/1994 | Faust | |
| 5,412,189 A | 5/1995 | Cragun | |
| 5,459,461 A | 10/1995 | Crowley et al. | |
| 5,470,212 A | 11/1995 | Pearce | |
| 5,488,204 A | 1/1996 | Mead et al. | |
| 5,496,174 A | 3/1996 | Garner | |
| 5,496,175 A | 3/1996 | Oyama et al. | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,187,398 B1 | 2/2001 | Eldridge | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | MacLean et al. | |
| 6,573,844 B1 | 6/2003 | Venolia et al. | |
| 6,636,202 B2 | 10/2003 | Ishmael et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,683,627 B1 | 1/2004 | Ullmann et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,004,655 B2 | 2/2006 | Ferrara | |
| 7,015,894 B2 | 3/2006 | Morohoshi | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,079,111 B2 | 7/2006 | Ho | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |

(56) References Cited

U.S. PATENT DOCUMENTS

| | | |
|---|---|---|
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |

(56) References Cited

U.S. PATENT DOCUMENTS

| | | |
|---|---|---|
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 9,372,539 B2 | 6/2016 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |

(56) References Cited

U.S. PATENT DOCUMENTS

| | | |
|---|---|---|
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1* | 4/2012 | Ciesla .............. G06F 3/044 345/174 |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| GB | 190403152 A | 12/1904 |
| GB | 108771 A | 8/1917 |
| GB | 1242418 A | 8/1971 |
| JP | s63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |

(56) References Cited

FOREIGN PATENT DOCUMENTS

| WO | 2011133604 A | 10/2011 |
|----|--------------|---------|
| WO | 2011133605 A | 10/2011 |
| WO | 2013173624 A2 | 11/2013 |
| WO | 2014047656 A2 | 3/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

\* cited by examiner

DYNAMIC TACTILE INTERFACE

CROSS-REFERENCE TO RELATED APPLICATIONS

The application claims the benefit of U.S. Provisional Patent Application No. 62/045,145, filed on 3 Sep. 2014, which is incorporated in its entirety by this reference.

This application is related to U.S. patent application Ser. No. 12/319,334, filed on 5 Jan. 2009; U.S. patent application Ser. No. 11/969,848, filed on 4 Jan. 2008; and U.S. patent application Ser. No. 13/414,602, filed on 7 Mar. 2012, all of which are incorporated in their entireties by this reference.

TECHNICAL FIELD

This invention relates generally to touch-sensitive displays, and more specifically to a new and useful dynamic tactile interface in the field of touch-sensitive displays.

DESCRIPTION OF THE EMBODIMENTS

The following description of the embodiment of the invention is not intended to limit the invention to these embodiments, but rather to enable any person skilled in the art to make and use this invention.

1. Method and Applications

Figure 1:
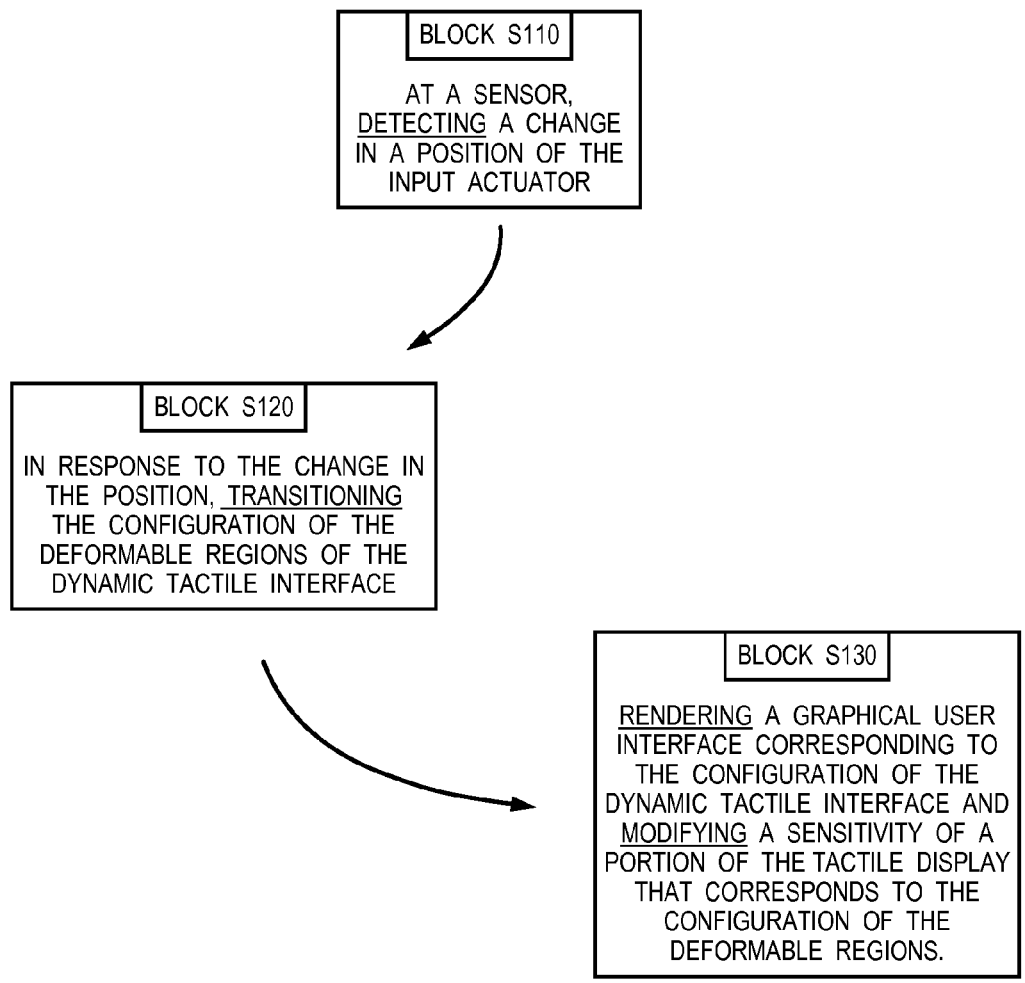
FIG. 1 is a flowchart representation of one embodiment of the invention.

As shown in FIG. 1, a method S100 for detecting and transitioning a configuration of a dynamic tactile interface coupled to a computing device incorporating a touchscreen, wherein the dynamic tactile interface includes an tactile layer and a substrate, the tactile layer defines a tactile surface, a deformable region, and a first region adjacent the deformable region and coupled to the substrate opposite the tactile surface, the deformable region cooperates with the substrate form a variable volume filled with a mass of fluid, the variable volume fluidly coupled to a fluid channel and a displacement device that transitions the deformable region from a retracted setting into an expanded setting in response to actuation of an input actuator coupled to the displacement device, the deformable region substantially flush with the first region in the retracted setting and tactilely distinguishable from the first region in the expanded setting. Method S100 includes: at a sensor, detecting a change in a position of the input actuator; in response to the change in the position, correlating the configuration of the deformable regions of the dynamic tactile interface to a rendered graphical user interface on the touchscreen; and, in response to the change in position, correlating the position to a sensitivity of the touchscreen.

Method S100 can function to control the configuration of the graphical user interface of the touchscreen and the sensitivity of the touchscreen based on the detected change in position of the input actuator and an interpreted configuration of deformable regions. Generally, method S100 functions to detect manual actuation of the displacement device and, in response to detected manual actuation to the displacement device, to manipulate the rendered images displayed on the computing device display and the sensitivity of the touchscreen to accommodate for the change in the configuration of the dynamic tactile interface.

2. Dynamic Tactile Interface

The dynamic tactile interface can include and/or interface with an tactile layer including a substrate, the tactile layer including a deformable region and a first region, the first region adjacent the deformable region and coupled to the substrate opposite the tactile layer, and the deformable region cooperating with the substrate to form a variable volume filled with a mass of fluid. Generally, the tactile layer defines one or more deformable regions operable between expanded and retracted settings to intermittently define tactilely distinguishable formations over a surface, such as over a touch-sensitive digital display (e.g., to form a touchscreen), such as described in U.S. patent application Ser. No. 13/414,589.

Generally, the dynamic tactile interface can couple to a computing device (e.g., a smartphone), to provide intermittent tactile guidance to a user entering an input into an input region on the device, such as described in U.S. patent application Ser. No. 13/414,589. For example, the tactile layer can be integrated into or applied over a touchscreen of a mobile computing device to provide tactile guidance to a user interacting with the touchscreen to control the device. The tactile layer can include a deformable region, which can be planar or flush with the first region in the retracted setting and can be raised above (i.e., offset above) the first region to define a tactilely distinguishable feature on the tactile layer in the expanded setting. The deformable region can coincide with (i.e., be arranged over) an input key rendered with a graphical user interface on a touch-sensitive display of the device, the deformable region mimicking a (raised) physical hard key (or guide, etc.) in the expanded setting and thus tactilely guiding user entry of the corresponding input key into the device. The deformable region can then be retracted to yield a flush, smooth, and/or continuous surface with substantially minimal optical distortion across both the first region and the deformable region. For example, a user can manually actuate the displacement device just before providing an input on the touchscreen, and the displacement device can thus transition the deformable region into the expanded setting to provide tactile guidance to the user during entry of inputs onto the touchscreen. The user can then actuate the displacement device to transition the deformable region back into the retracted setting when the user no longer desires tactile guidance across the tactile layer or is no longer providing inputs to the touchscreen such that the deformable region returns to substantially flush with the first region, thereby yielding reduced optical distortion of an image output by the touch-sensitive display and transmitted through the tactile layer.

In particular, the dynamic tactile interface, as described in U.S. patent application Ser. Nos. 11/969,848, 13/414,589, 13/456,010, 13/456,031, 13/465,737, and 13/465,772, which are incorporated in their entireties by this reference, can also incorporate additional components that define the displacement device and cooperate with the dynamic tactile interface to displace fluid into and out of a bladder in order to expand and retract one or more deformable regions of the dynamic tactile interface. The bladder can be coupled to the fluid channel and the displacement device. Thus, the displacement device can displace fluid from the bladder into the fluid channel and the variable volume, thereby expanding the deformable region into the expanded setting. Additionally, the displacement device can displace fluid from the fluid channel into the bladder, thereby drawing the deformable region into the retracted setting.

The displacement device of the dynamic tactile interface can include a bladder and a displacement device actuator, which includes a platen that compresses the bladder in response to actuation (e.g., translation, rotation, depression, etc.) of the input actuator. The displacement device actuator can be a rotary actuator, a linear slide actuator, and/or any other actuator (e.g., pump) suitable for actuating the displacement device, as described in U.S. patent application Ser. No. 14/081,519, filed 15 Nov. 2013, which is incorporated in their entireties by this reference. Generally, the displacement device can function to displace fluid from the bladder into the variable volume, such as via a fluid channel, to transition the deformable region adjacent the variable volume from the retracted setting into the expanded setting. For example, the deformable region can be flush with an adjacent first region in the retracted setting and can be offset above and tactilely distinguishable from the first region in the expanded setting. The displacement device can also transition the deformable region from the expanded setting into the retracted setting. For example, the platen can expand (e.g., stretch) the bladder in response to actuation of the displacement device actuator in a second direction opposite the first direction to draw fluid from the variable volume back into the bladder via the fluid channel. The bladder of the displacement device can therefore be coupled to the variable volume of the tactile layer via a fluid channel.

The displacement device can include a sensor or a set of sensors coupled to (e.g., embedded, bonded to, adjacent, etc.) the displacement device and/or the displacement device actuator. The sensor or set of sensors can include any one or combination of sensors that detect position data of the input actuator and/or the displacement device, such as optical sensors, capacitive sensors, magnetic field sensors, ultrasonic sensors, piezo-electric sensors, limit switches, encoders, inductive sensors, potentiometers, etc. Therefore, the dynamic tactile interface can also include a wireless or wired communication module (e.g., a physical data port of a Bluetooth module) that communicates a state (or other output) of the displacement device sensor into the computing device, such as over wireless or wired communication protocol.

The dynamic tactile interface can be integrated into an aftermarket housing for a computing device, wherein the tactile layer can be applied over a touchscreen of the computing device. The dynamic tactile interface can include an input actuator that displaces fluid into and out of the fluid channel in order to transition the deformable regions between expanded and retracted settings. The input actuator can include a sensible marker, such as a magnet, remotely detectable by a sensor integrated into the computing device to remotely determine a position of the actuator and therefore a position of the deformable region. The input actuator can additionally or alternatively include a sensible finger (e.g., protrusion) that contacts the touchscreen and is detectable to sensors integrated into the touchscreen. For example, in a computing device with a capacitive touchscreen, the sensible finger can be a capacitive member that slides along an edge of the touchscreen, and the capacitive touchscreen can detect a change in position of the capacitive member when the actuator is actuated. Alternatively, the sensible finger can include a resistive element that interacts with a resistive touchscreen or can include an optically-detectable element that interacts with an optical touchscreen to communicate a position of the actuator into the computing device. The dynamic tactile interface can include one or more input actuators with each input actuator actuating a set of deformable regions actuated independently from other sets of deformable regions, and each actuator can include a sensible marker detectable by the computing device without any wired or wireless connection with the aftermarket housing or the dynamic tactile interface. Alternatively, the input actuators can include detectable by the computing device through wired connection between the dynamic tactile interface and the computing device.

In one example, the dynamic tactile interface can be integrated into an aftermarket housing for a computing device, such as a mobile phone, a tablet, a gaming controller, etc., wherein an tactile layer can be applied over a touchscreen of the computing device. In one example, the input actuator can be a rotary actuator. The rotary actuator can operate the dynamic tactile interface by rotating, thereby expanding or retracting the deformable region(s) of the tactile layer. The rotary actuator can include a disk that a user rotates to actuate the displacement device and a marker integrated into a location on the disk radially offset from the center of the disk. With the aftermarket housing assembled over the computing device, a remote sensor, integrated within the computing device, remotely detects when the marker rotates past the remote sensor and/or a position of the marker relative to the remote sensor. Thus, the sensor remotely detects an arcuate position of the marker. The computing and/or dynamic tactile interface device may include a processor, memory, a display, and other components that are typically found on computers such as desktop computers, laptop computers, computing devices in automobiles, tablet computers, mobile devices, and smart phones. The memory may include one or more programs or code which may be executed by the processor to perform tasks and operations including rendering or causing to be rendered a graphical user interface on the display and updating the graphical user interface based on signals and/or other data received from one or more sensors and input devices. The processor within the computing device can interpret data from the sensor to determine an arcuate position of the marker and, thus, a position of the deformable region of the dynamic tactile interface. The computing device can then modify a graphical user interface rendered on the display of the computing device and/or modify a function (e.g., sensitivity) of the touch sensor within the computing device according to the position of the input actuator and, thus, the configuration of the dynamic tactile layer.

In various examples, the dynamic tactile interface can be integrated into a case, peripheral, or aftermarket peripheral for a tablet, a smartphone, a laptop computer, a desktop computer, a personal data assistant (PDA), a personal music player (e.g., MP3 player), or other computing device. The dynamic tactile interface can also be incorporated into or arranged over an existing automotive dashboard touch-sensitive display or console, a television, a personal navigation device, a watch, a home stereo system interface, a lighting or thermostat control system, a machine tool controller, a computer mouse, a computer touchpad, a keyboard or keypad, a gaming controller or console, cooking equipment, or any other suitable electronic and/or digital computing device.

3. Applications

In one example application of method S100, the dynamic tactile interface is integrated into an aftermarket housing for a computing device, wherein the dynamic tactile interface is arranged over a touchscreen incorporated in the computing device. The displacement device of the dynamic tactile interface can include two input actuators: the first input actuator controlling a first set of deformable regions defining an alphanumeric keyboard in a portrait layout, the second input actuator actuating a second set of deformable regions defining an alphanumeric keyboard in a landscape layout. The first and second input actuators can each include a capacitive finger that slides along an edge of the capacitive touchscreen of the computer. Thus, a capacitive touch sensor integrated into the computing device (e.g., a touchscreen) can detect changes in positions of the first and second input actuators. For example, the first input actuator can slide vertically along a vertical edge of the touchscreen and the second input actuator can slide horizontally along the horizontal edge of the touchscreen. The first and second input actuators are each coupled to separate displacement devices and independently actuate respective sets of deformable regions. Alternatively, the input actuators can control a same displacement device and actuate valves controlling which set of deformable regions are actuated due to actuation of the displacement device. In response to detection of the first input actuator in an expanded setting position, a processor within the computing device updates a graphical user interface rendered on the display of the computing device to depict a portrait alphanumeric keyboard and locks the graphical user interface in a portrait display mode. Method S100 can further increase the sensitivity of the capacitive touch sensor proximal or coincident the first set of deformable regions now elevated over keys of the portrait alphanumeric keyboard. Furthermore, in response to detection of the second input actuator in an expanded setting position, the processor can update the graphical user interface rendered on the touchscreen to depict a landscape alphanumeric keyboard and then lock the graphical user interface in a landscape display mode while the deformable regions are in the expanded setting. Method S100 can also increase the sensitivity of the capacitive touch sensor proximal or coincident the second set of deformable regions now elevated over keys of the landscape alphanumeric keyboard. Alternatively, the graphical user interface can change color of an image rendered by the display at a location coincident the first set of deformable regions.

In one example application of method S100, the dynamic tactile interface is arranged over a touchscreen incorporated in the computing device. The displacement device includes a linear slide actuator as described in U.S. patent application Ser. No. 14/081,519, which is incorporated in its entirety by this reference. The linear slide actuator can include an integrated solenoid, which generates a magnetic field detectable by a magnetically coupled magnetic field sensor. The magnetic field sensor can be integrated into the computing device, wherein the magnetic field sensor remotely detects proximity of the solenoid and, thus, the linear slide actuator. Thus, if a track on which the linear slide actuator slides includes an array of magnetic field sensors, as the linear slide actuator travels along the track, the magnetic field sensors can detect (e.g., triangulate) the position of the linear slide actuator on the track. A processor integrated into the computing device and coupled to the magnetic field sensors can correlate the position of the linear slide actuator to a configuration of expanded deformable regions, such as a keyboard layout (e.g., a portrait alphanumeric keyboard). The processor integrated into the computing device can also remotely correlate the position of the linear slide actuator, which is detected remotely by a sensor integrated into the computing device, to the graphical user interface rendered by the tablet on the touchscreen, such that the graphical user interface corresponds to an image of an alphanumeric keyboard (e.g., a portrait QWERTY graphical keyboard) with the keys of the keyboard corresponding to the deformable regions of the configuration of expanded deformable regions. Likewise, another processor within the computing device can reconfigure one or more touch sensors integrated into the touchscreen of the tablet such that portions of the touch sensor corresponding to (i.e., arranged below) the deformable regions of the configuration of expanded deformable regions have increased sensitivity to contact on the tactile surface and/or such that portions of the touch sensor corresponding to first regions of the tactile layer adjacent the deformable regions exhibit decreased sensitivity to contact on the tactile surface. Thus, by reconfiguring input sensitivities across the touch sensor, method S100 can function to substantially ensure that inputs on the tactile surface can be detected by the touch sensor even over deformable regions in the expanded setting and/or to lessen detection of inadvertent or incidental inputs (e.g., typographical errors) into the computing device. Additionally, when the linear slide actuator translates from a first position to a second position, a Block of the method can cooperate with a sensor (e.g., a magnetic field sensor) within the computing device to detect this change, to correlate the second position with a particular configuration of expanded deformable regions across the tactile layer, and to modify or update a graphical user interface (e.g., a gaming interface, a landscape alphanumeric keyboard) rendered on the display of the computing device.

4. Actuation Detection

Block S110 of method S100 includes, at a sensor, detecting a change in a position of the input actuator. Generally, Block S110 functions to detect a position and/or an extent of actuation of the displacement device. Thus, Block S110 can continuously or intermittently detect a displacement of the input actuator and/or a magnitude of displacement of the input actuator. For example, Block S110 can detect a magnitude of linear displacement of the input actuator of a linear slide displacement device, a magnitude of arcuate displacement of the input actuator of a rotary displacement device, and/or a magnitude of a mass and/or volume of fluid displaced by the displacement device.

In one implementation of Block S110, a sensor can detect an extent of actuation of the input actuator. The sensor can be integrated into the computing device and, therefore, remotely (i.e., without a wired or wireless connected over with digital data is transmitted) detect movement of the input actuator. Alternatively, the sensor can be coupled to the displacement device, the displacement device actuator and can detect the motion or change of position of the input actuator. In this implementation, the sensor can detect the magnitude of the change in position of the input actuator.

In one example, Block S110 includes detecting a magnetic field generated by a magnet coupled to (e.g., embedded in) the input actuator with a three-axis vector magnetometer integrated into the computing device (e.g., a mobile phone with a built in magnetometer). The vector magnetometer can detect changes in a magnetic field resulting from the change in position of the magnet integrated into the input actuator. Block S110 can detect the change in position of the input actuator with any other magnetometer suitable to detect the change in position of the input actuator. Block S110 can interpret changes in the detected magnetic field as movement of the input actuator at a processor arranged within the computing device. Thus, the processor can determine a change in position and/or an absolute position of the input actuator based on a change in the detected magnetic field of the magnet integrated into the input actuator.

In another example, Block S110 includes detecting the change of position of the input actuator using sensors integrated into the touchscreen of the computing device. For example, for a capacitive touchscreen, the input actuator can include a capacitive finger that extends from the input actuator to an edge of the touchscreen. As the input actuator moves, the finger slides across the edge of touchscreen. Thus, the capacitive sensors in the touchscreen can detect presence and movement of the capacitive finger along the edge of the touchscreen. Block S110 can interpret movement of the capacitive finger at the edge of the touchscreen as the change in position of the input actuator and differentiate capacitive inputs at the edge of the touchscreen by the capacitive finger from an input by a user at other locations on the touchscreen.

5. Actuation Response

Figure 2:
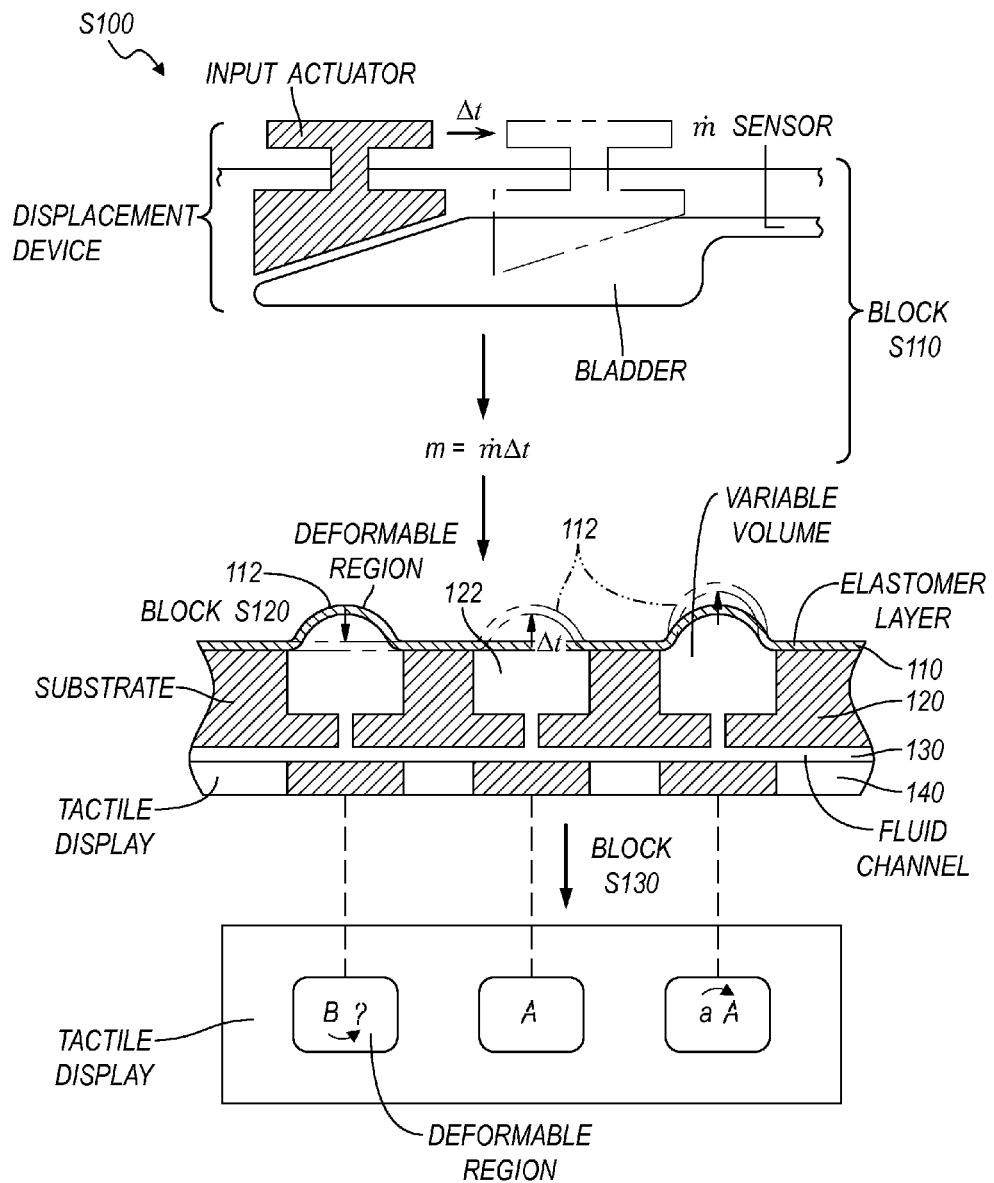
FIG. 2 is a flowchart representation in accordance with one implementation of method S100.

As shown in FIG. 2 Block S120 of method S100 includes rendering a graphical user interface on the touchscreen, the graphical user interface corresponding to the configuration of the dynamic tactile interface, and/or modifying a sensitivity of a portion of the touch sensor that corresponds to the configuration of the deformable regions. Generally, Block S120 of method S100 functions to render a suitable graphical user interface to modify the tactile sensitivity of touch sensors of the touchscreen of the computing device in response to the detected change in the position of the displacement device.

One implementation of Block S120 includes rendering a graphical user interface corresponding to the configuration of deformable regions of the tactile layer. For example, the graphical user interface can render images of input keys, such as on a virtual keyboard, such that the images of input keys are coincident with the deformable regions. Therefore, the dynamic tactile interface provides tactile guidance aiding selection of an input key through depression of the deformable region coincident with an image of the input key.

An example of the preceding implementation of Block S120 includes rendering a capitalized keyboard in response to transition of the deformable regions in a keyboard layout from an expanded setting into a more expanded setting, wherein the deformable regions are elevated higher above the first region in the more expanded setting than the deformable regions in the expanded setting. In this example, the deformable regions in the expanded setting correspond to a graphical user interface that depicts an alphanumeric keyboard of lowercase letters and numbers. In response to expansion of the deformable regions to the more expanded setting, the computing device renders on the touchscreen a graphical user interface yielding an uppercase keyboard of letters and numbers. Alternatively, the computing device can render a graphical user interface yielding a foreign keyboard layout (e.g., with German or Chinese characters).

Another example of the preceding implementation of Block S120 includes rendering a graphical user interface with brighter and more contrasted images of input keys. The modification of the input keys in the rendered graphical user interface may be provided in response to a signal received from a sensor and cause the keys to be easier to perceive through the deformable region in the expanded setting. The modifications to the rendered graphical interface may help to compensate for distortion of the images due to refraction of the images across fluid and the tactile layer. As described in U.S. patent application Ser. No. 14/320,041, which is incorporated in its entirety by this reference, the graphical user interface can also modify a portion of the images by shifting a set of pixels to black or a lower intensity and the location of the images on the touchscreen.

Another example of, in response to a sensor signal, modifying a rendered graphical user interface to be easier to perceive through a deformable region includes rendering a graphical user interface with space between the keys or other input buttons optimized for use with the fluid and tactile layer. For instance, the space between the keys could be provided as a particular color that made it easier to discern the location of the dynamic keys while in a raised position, or a change in the underlying graphical image around and beneath the raised dynamic key that reduced or compensated for distortion of images of the keys or buttons due to refraction of the key or button images, or the refraction of the space between the keys or buttons, across the fluid or tactile layer. In particular, the space between keys, buttons, or other rendered images associated with a region to receive input from a user might be provided as black.

Another example of the preceding implementation of Block S120 includes rendering an image with input keys that are coincident with the deformable regions in the configuration of the deformable regions. For example, Block S120 can render a portrait alphanumeric keyboard in response to transition of the configuration of deformable regions into a portrait layout, as shown in FIG. 3A.

Another example of the preceding implementation of Block S120 includes rendering a series of screen images with input keys rendered in the same location in a display, where the rendered locations are coincident with deformable regions. For example, Block S120 can render a first portrait alphanumeric keyboard in a first rendered page in response to transition of the configuration of deformable regions into a portrait layout, as shown in FIG. 3A. Block S120 can subsequently render a second page with one or more buttons, or a second keyboard, the one or more buttons or second keyboard rendered such that the buttons or keys are positioned to correlate to deformable regions associated with the first rendered keyboard. In this example, separate and subsequent screens can be rendered with buttons, keyboard images, gaming interfaces, volume controls, camera shutter button images, etc. that correspond to a single set of deformable regions.

Figure 3A:
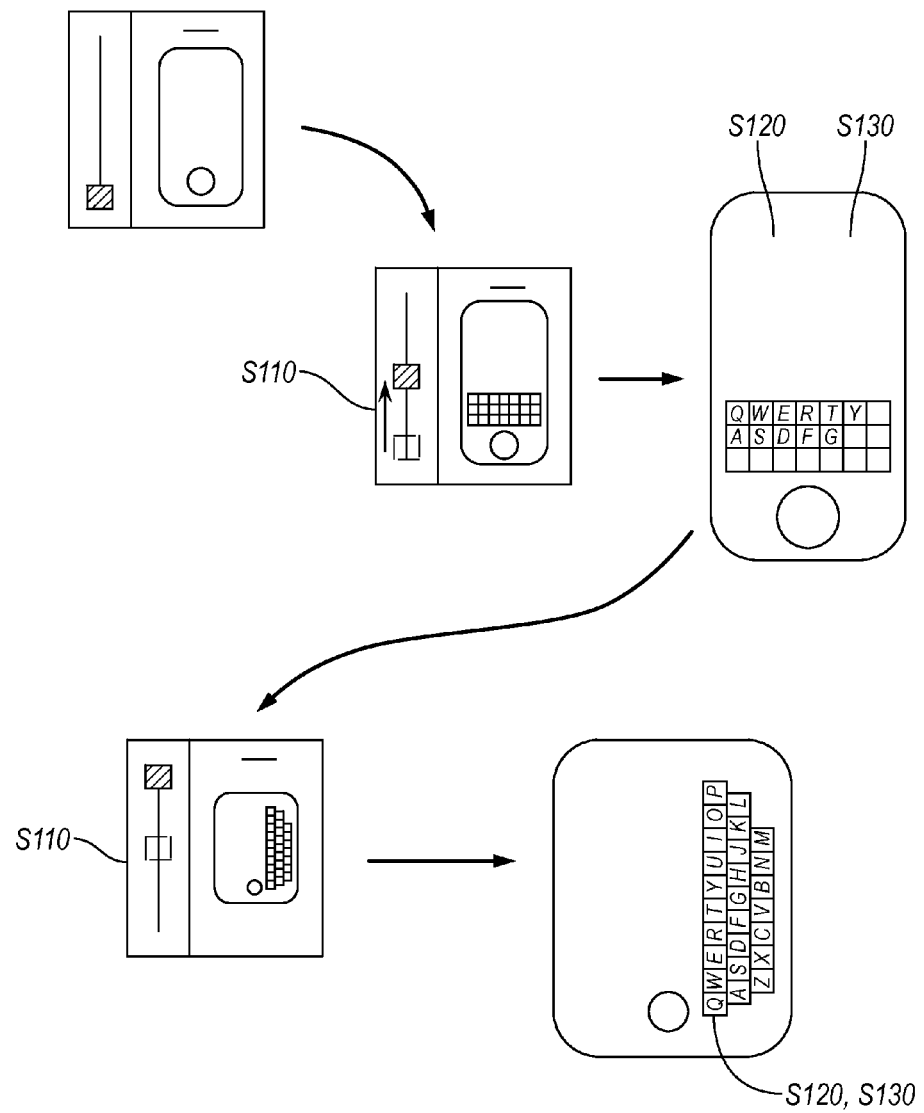
FIG. 3A-B are flowchart representations in accordance with one implementation of method S100.
Figure 4:
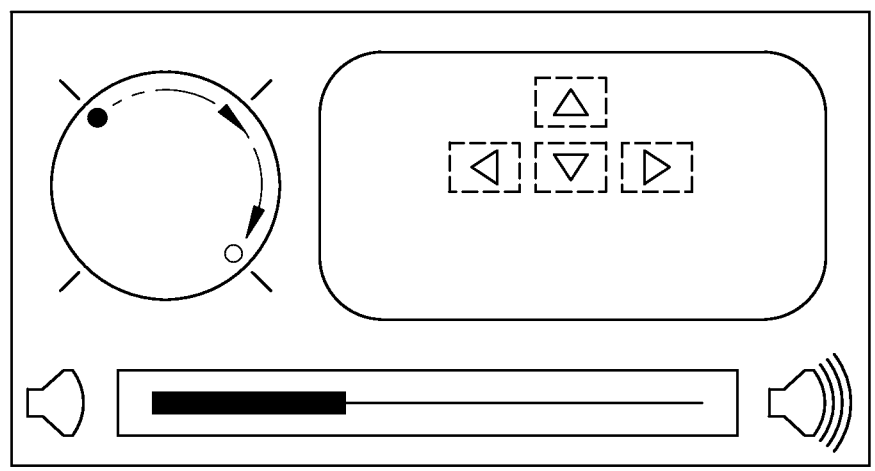
FIG. 4 is a schematic representation in accordance with one implementation of method S100.

For example, Block S120 can render a portrait alphanumeric keyboard in response to transition of the configuration of deformable regions into a portrait layout, as shown in FIG. 3A. Block S120 can also render layout alphanumeric keyboard images, gaming interfaces, volume controls, camera shutter button images, etc. coincident with deformable regions of the configuration of deformable region in response to transition of the configuration of the deformable regions, as shown in FIG. 4.

Figure 3B:
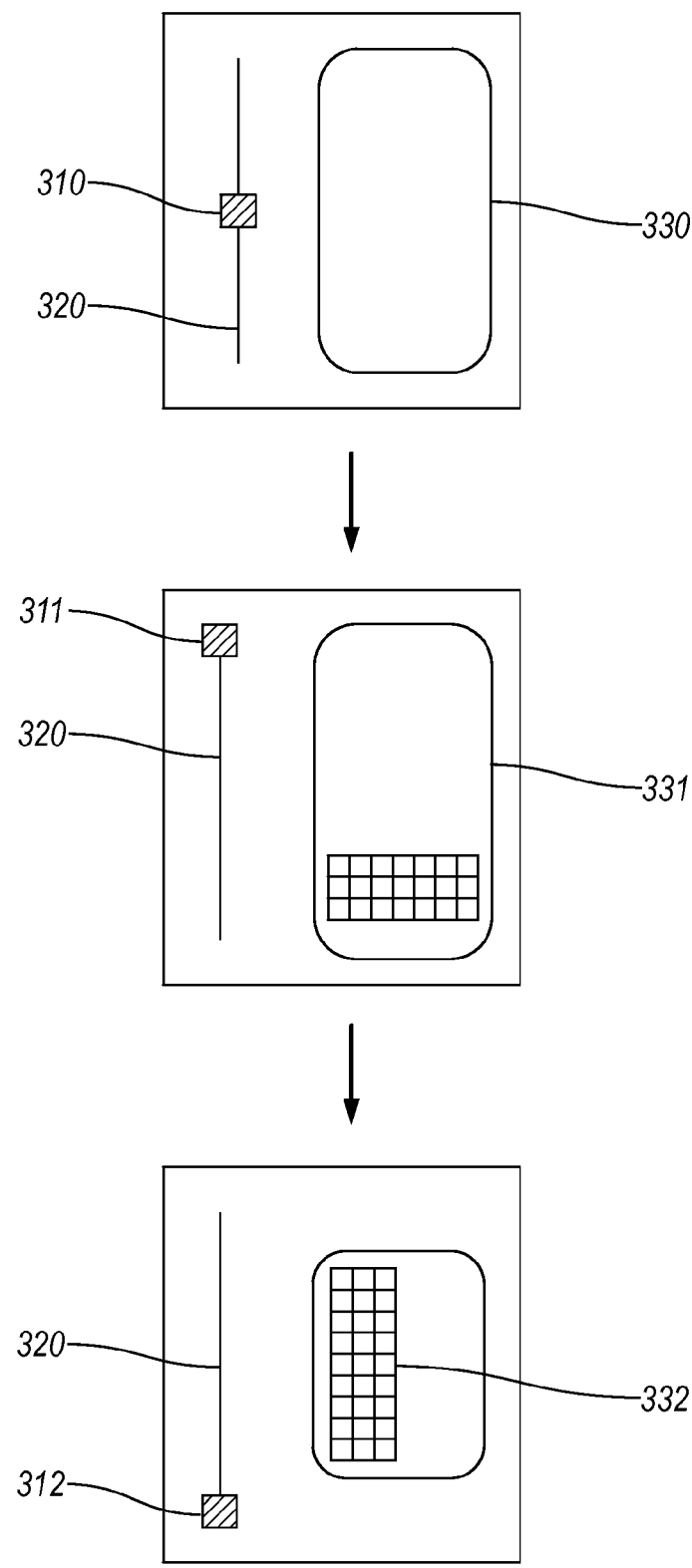

Another example of the preceding implementation of Block 120 includes rendering an image with input keys that are coincident with the deformable regions in the configuration of the deformable regions, wherein the deformable regions may be configured when an actuator is moved out of a central position. FIG. 3B illustrates a slider that is initially positioned in the middle of a linear track. The slide may be moved in either direction along the track. The slider operates as an actuator to move a plunger or other object towards one of the two bladders, wherein a bladder may be located at each end of the track or at other locations along the track. Additionally, the bladder and/or any displacement device, as well as any plunger that manipulates the bladder, may be located somewhere other than at an end of the track or along the track In some instances, a signal from a sensor may indicate whether the slider is in a position that correlates to a particular rendered display. For example, when a slider is positioned in the middle 310 of track 320, a signal may be sent to indicate that no buttons, keyboards, or other graphical image should be rendered to correlate to a deformable region of the dynamic tactile layer. In some instances, however, when the slider is positioned in the middle 310 of the track 320, there may be no signal provided to the display device and, as a result, no buttons, keyboards, or other graphical image rendered in the display that correlates to a deformable region of the dynamic tactile layer. When input is received to manually displace the slider from the center position 310 to a first end 311 of the track, the slider may engage a bladder located at the location 311 to move fluid to a first set of deformable regions, thereby providing a set of deformable regions to enter an expanded state. Additionally, one or more sensors located at position 311 may provide a signal to the display device that result in one or more buttons, keyboards, or other graphical user interface elements that are selectable through the tactile interface deformable regions, for example a keyboard 331 in a portrait orientation. The deformable regions in the expanded state may be positioned to correspond with the rendered graphical user interface elements such that when the deformable regions receive a force applied by a user, either through the user's finger, a stylus, or other input, the input will be received in a location that corresponds to the rendered graphical user interface element. In some implementations, one or more sensors can be placed at various locations other than position 311, and can operate to detect motion of the slider into position 311.

When input is received to manually displace the slider from the center position 310, 311 or any other location to a second end 312 of the track, the slider may engage a bladder located at the location 312 to move fluid to a second set of deformable regions, thereby causing the set of deformable regions to enter an expanded state. One or more sensors located at position 312 may provide a signal to the display device that result in one or more buttons, keyboards, or other graphical user interface elements that are selectable through the tactile interface deformable regions, for example a keyboard 332 in a landscape orientation. The rendered graphical user interface elements may be positioned to correspond with the deformable regions in the expanded state such that when the deformable regions receive a force applied by a user, either through the user's finger, a stylus, or other input, the input will be received in a location corresponding to the rendered graphical user interface element.

In some instances, when the slider is moved from a first position to a second position between an at-rest or off position and an end point along a track for moving the slider, the sensitivity of a touch sensor associated with a deformable region may be adjusted. The computing device may detect the location of the slider set by the user and infer the height of the deformable regions and the corresponding optimized sensitivity level. A graphical user interface may provide an indicator that illustrates a user preference for the sensitivity based on the detected location of the slider, such that the user may move the slider along the track and watch the indicator provide information that indicates whether the slide indicator is at the position associated with the user preference. The indicator may be a color, a numerical indicator, a rendered slide, a dial, or some other graphical icon rendered as part of the graphical user interface and dynamically updated as the user moves the slider. In some instances, input actuators other than a slider may be used to adjust the height of a deformable region and may be detected by sensors to infer the height of the deformable regions, such as for example a dial, one or more push buttons, and other input mechanisms.

In some implementations, one or more sensors may be utilized with a sliding or other actuator to provide signals to an underlying display device that vary with the degree of movement or other input of the actuator. For example, a slider actuator may be configured with sensors that extend along the track upon which the slider moves. As the slider moves along the track, the sensors may detect the different positions of the slider. When a slider actuator is half way between a rest position and an end point of the track, the deformable regions may expand half as much as they are configured to do so when the slider actuator is positioned at the end point of the track. In particular, the slider may mechanically actuate a peristaltic pump that displaces fluid and causes the deformable regions to expand or retract incrementally as the slider is moved. Similarly, sensors may be used to adjust the graphical user interface rendered in the display based on a position of the slider actuator. For example, the graphical user interface may include an indicator that communicates the amount a slider actuator has been moved. This may be useful to determine the accuracy of the sensors and a confirmation of what elements the graphical user interface is providing. In particular, when a slider actuator is moved half way from an at rest position to a particular track end, a rendered graphical user interface may include a lower case keyboard and an indication that the slider is only moved half way towards the track end, and when the slider is moved completely to the end of the particular track the rendered graphical user interface may include an upper case keyboard along with an indication that slider actuator is moved completely to the end of the track. In some instances, moving a slider part way may be used to change the color of certain keys of a keyboard, such as for example by changing the color of numeric keys when the slide is moved half way towards an end point.

Figure 3C:
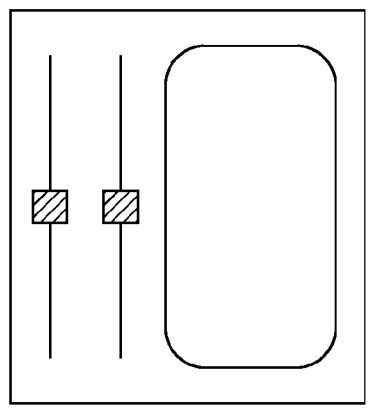
FIGS. 3C-E are schematic representations in accordance with one implementation of method S100.
Figure 3D:
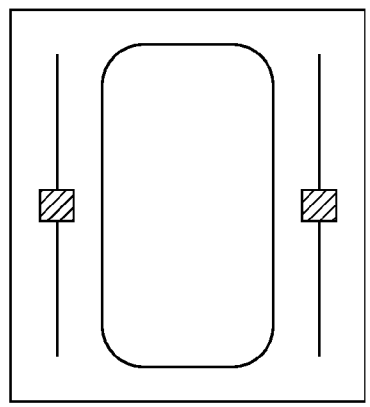
Figure 3E:
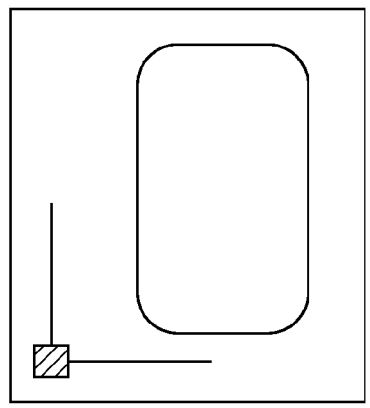

In some implementations, as shown in FIGS. 3C, 3D, and 3E, more than one actuator such as a slider may be implemented to communicate with a display device. FIG. 3C illustrates a dynamic tactile interface having two sliders positioned next to each other. The two sliders may be used to configure different elements. For example, a first slider may be used to control the sensitivity for a set of deformable regions as well as particular sets of deformable regions that are provided through a tactile interface, such as a keyboard in portrait configuration when the first slider is moved to towards a first end of the track, or a keyboard in landscape configuration when the first slider is moved towards the other end of the track, the sensitivity of each keyboard depending on how far the slider is moved from the center of the track to the particular end of the track associated with the particular keyboard. The other slide may be used to provide input for configuring a rendered graphical user interface, such as for example providing subset of highlighted keys in a keyboard, a brightness, contrast or intensity of the graphical user interface, providing a particular language of content, and other graphical user interface configurations. When the sliders are positioned next to each other, they may be manipulated by the same finger or fingers from the same hand by the user. The sliders may also be positioned apart from each other, such as for example on opposite sides of the device. FIG. 3D illustrates a dynamic tactile interface having two slider located on opposite sides of the front of a display device. The sliders may have different functions, such as configuring deformable region sensitivity and configuring a graphical user interface. FIG. 3E illustrates a single slide having a first track in a first direction and a second track in a second direction. The tracks in the dynamic tactile layer of the device of FIG. 3E are perpendicular to each other and meet at a particular point, forming an "L" shaped track. A single slider is configured to move along both tracks, in a first back and forth direction on the first track and in a second, perpendicular back and forth direction in the second track. Each track segment (each straight portion of the track) may have a different function, such as configuring deformable region sensitivity, configuring a graphical user interface, providing different sets of keys, and other functions.

Block S120 can also render layout alphanumeric keyboard images, gaming interfaces, volume controls, camera shutter button images, etc. coincident with deformable regions of the configuration of deformable region in response to transition of the configuration of the deformable regions, as shown in FIG. 4. The actuator on of the dynamic tactile interface of FIG. 4 is implemented as a dial. The dial may include one or more plungers that, when travelling in a circular motion as the dial is rotated or turned, may compress one or more bladders positioned along a portion of the circular path traveled by the plunger as the dial is turned. In some implementations, as the dial is rotated or turned, one or more valves may be opened in addition to compressing one or more bladders. For example, when the dial is rotated or turned to engage a valve and bladder, the compressed bladder may force fluid through the open valve and into the deformable region, setting the deformable region to an expanded state. In some implementations, the dial may engage multiple bladders located near or away from the dial, as well as one or more valves located near or away from the dial. As the dial is turned, it may cause a single bladder to become increasingly compressed or it may cause one or more additional bladders to become compressed.

The different bladders placed in the circular path of the plunger may force fluid into different sets of deformable regions. For example, a first bladder in the circular path may cause a set of deformable regions associated with a set of audio playback control to enter an expanded state, a second bladder in the circular path may cause a set of deformable regions associated with website navigation to enter an expanded state, a third bladder in the circular path may cause a set of deformable regions associated with a keyboard in portrait mode to enter an expanded state, and a fourth bladder in the circular path may cause a set of deformable regions associated with a keyboard in landscape mode to enter an expanded state.

In some implementations, the actuator may be implemented as one or more buttons rather than a slider. Each button may be configured to open or close a valve, as well as compressing one or more bladders. When the button is depressed, fluid may flow from the compressed bladder through the open valve and into the deformable region, setting the deformable region to an expanded state. The button may stay in place until depressed again, for example utilizing a similar double-click closing mechanism as a clickable pen (with cams, springs, and other elements) In some implementations, pressing one or more of multiple buttons may open or close one or more valves while moving a slider or applying a force to another input actuator may cause fluid to be moved through the opened one or more valves.

Sensors within the dynamic tactile layer may detect the current location of the dial and communicate the location via one or more signals from the one or more sensors to the display device. The display device may provide an interface that correlates to the particular set of deformable regions, such as an audio playback control interface (shown in FIG. 4), website navigation interface, a keyboard interface in a portrait mode, a keyboard interface in a landscape mode, and other interfaces.

One variation of the method S100 includes Block S130, which recites, in response to the change in position, correlating the change in position to a sensitivity of the touchscreen and/or rendering a graphical user interface corresponding to the configuration of the dynamic tactile interface. Generally, Block S130 can function to modify the sensitivity of touch sensors integrated into the touchscreen of the computing device to accommodate for changes in the configuration of the dynamic tactile interface.

In this variation, touch sensors coincident with the deformable region can increase in sensitivity to compensate for decreased sensation of contact due to the presence of a fluid layer and the tactile layer between a contacting object (e.g., a finger) and the touchscreen. For example, in a computing device with a capacitive touchscreen, Block S130 can increase sensitivity to distortions in the electrostatic field of the touchscreen by dynamically altering the sensor. Additionally or alternatively, Block S130 can alter sensitivity calibrations of the computing device, such that software executing on the computing device registers inputs more readily. For example, inputs that yield less electrostatic distortion of the capacitive touchscreen than can be detected typically by processors in the computing device can still be detected and processed by the computing device when the processors have been reconfigured to detect lesser electrostatic distortion. Additionally or alternatively, Block S130 can reduce sensitivity to inputs on the first region, thereby reducing the risk of incidental inputs (e.g., typographical errors) by lowering sensitivity of areas where inputs are undesirable.

In one example, Block S130 includes increasing the sensitivity of portions of the touchscreen of the computing device coincident the deformable regions and, thus, coincident images of keys of a keyboard. Thus, Block S130 functions to increase detection of inputs at desired input regions (e.g., keys of the keyboard). Block S130 can additionally or alternatively decrease sensitivity of portions of the touchscreen coincident the first regions (e.g., areas surrounding the keys).

Figure 5:
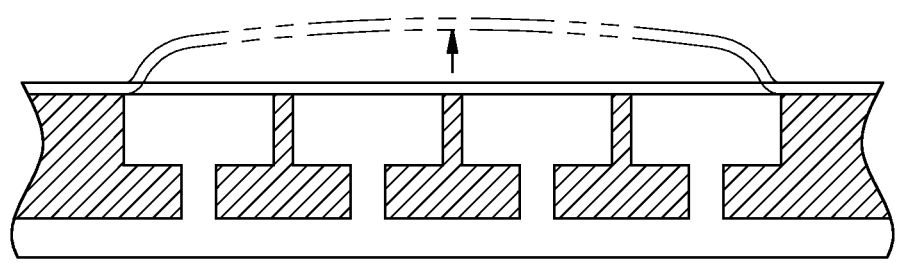
FIG. 5 is a flowchart representation in accordance with one implementation of method S100.

In another example, Block S130 includes increasing sensitivity of portions of the touchscreen coincident deformable regions, the increase in sensitivity proportional to the change in position of the input actuator. As the change in position of the input actuator can correspond displacement of fluid from a fluid bladder into the deformable regions and, thus, correspond to a height of the deformable regions relative the first region. As shown in FIG. 5, a height of the tactile surface with respect to the touch screen can be increased. Block S130 can increase sensitivity of areas of the touchscreen relative to an extent of actuation of the displacement device to accommodate for decreased sensitivity introduced by increased distance between the tactile surface of the tactile layer at the deformable regions and the touchscreen when the deformable regions are in the expanded setting.

6. Variations

Figure 6:
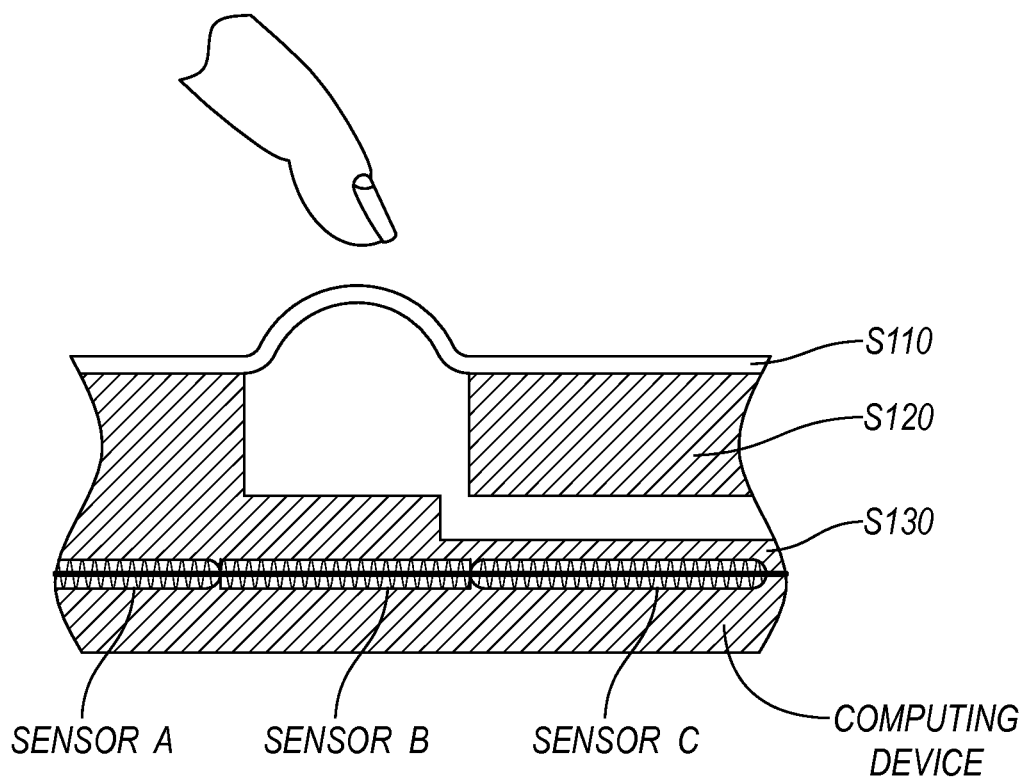
FIG. 6 is a flowchart representation in accordance with one implementation of method S100.

In another variation of the method S100, Block S110 of includes detecting—with a sensor integrated into the displacement device—the change in position of the input actuator. FIG. 6 illustrates a dynamic tactile interface that includes a set of computing device sensors positioned beneath a tactile layer. In one example of this variation, Block S110 includes intermittently detecting presence or absence of the input actuator or displacement device platen adjacent a sensor in a set of sensors that lie, for example, along the track on which the input actuator of a linear slide displacement device slides. In this example, the sensors can be binary sensors that detect either the presence or the absence of an object (e.g., the displacement device and/or input actuator) in proximity to the binary sensors. When the input actuator contacts a binary sensor, the binary sensor indicates to the processor that the input actuator is contacting the binary sensor. The processor can know a location of the binary sensor and can, thus, calculate a position of the input actuator from the known location of the binary sensor and the detected contact with the binary sensor.

In another example, Block S110 includes detecting the displacement of the displacement device with a set of sensory markers that line (e.g., in series) an external and/or internal surface of the bladder such that, when the displacement device platen compresses the bladder or slides over the bladder, Block S120 can detect the number of sensory markers that have passed a sensor coupled to the displacement device platen in order to calculate the displacement of the displacement device platen. A processor coupled to the sensor can determine which marker of the set of sensory markers is adjacent the sensor. For example, a processor arranged within the computing device and executing Block S110 can determine a magnitude of a displacement of fluid into the tactile layer and thus the height of one or more deformable regions within the tactile layer by storing a number of sensory markers that pass or contact the sensor.

Another implementation of Block S110 includes detecting the mass or volume of fluid displaced from the bladder to the fluid channel(s) and the variable volume(s) as a result of actuating the displacement device. Thus, a mass flow sensor (e.g., a pressure-based, thermal, or optical mass flow meter) can be coupled to the fluid channel and can determine the mass of fluid displaced by detecting a mass flow rate of the fluid being displaced. The mass flow sensor can intermittently detect a set of mass flow rates over a specified period of time. A processor can determine the mass (or volume) of fluid displaced by averaging the set of mass flow rates and multiplying an averaged mass flow rate by the specified period of time. Alternatively, the mass flow sensor can continuously detect the mass flow rate. Block S120 can also detect the mass (or volume) of fluid displaced with a mechanical flow meter, such as a current meter, which detects average flow velocity through detected hydroelectric power output. Block S120 can rely on sensors coupled to the fluid channel, the bladder, and/or the intersection of fluid channel to the bladder. The cross-sectional area of the flow area in which the sensor(s) detect the flow is known and can be used to detect the volume and/or mass of fluid displaced. A density of the displaced fluid can also be measured and/or assumed by the processor to calculate the volume and/or mass of the fluid displaced.

In some implementations, a rendered graphical user interface may be modified when used with a deformable region in the expanded state to reduce or eliminate the effects of refraction or distortion caused by the expanded deformable regions as well as the materials of the tactile layer, fluid and other materials used in the dynamic tactile layer. The substrate, the tactile layer, and the volume of fluid can each be substantially transparent such that images of a graphical user interface rendered on the digital display can be visible to a user through the substrate, tactile layer, and fluid arranged over the digital display. However, the substrate, the tactile layer, and the fluid can each exhibit a refractive index that differs from that of air such that expansion of one or more deformable regions into expanded settings yields variations in thickness across the dynamic tactile layer and thus non-uniform distortion (e.g., refraction) of light output from the digital display through the dynamic tactile layer. In particular, transition of a deformable region of the dynamic tactile layer from the retracted setting into the expanded setting can cause a user to visually detect optical distortion of an image rendered on the digital display. To compensate for the distortion, an image rendered on the digital display can be modified prior to transition of the deformable region into the expanded setting to reduce a user's perceived optical distortion of the image once the deformable region enters the expanded setting. The rendered image, in some implementations, can be systematically refreshed with modifications of the image to compensate for a dynamically changing profile of the dynamic tactile layer throughout transition of the deformable region from the retracted setting into the expanded, and vice versa. Details for modifying a graphical user interface when used with a deformable region are discussed in U.S. patent application Ser. No. 14/320,041, the entirety of which is incorporated herein by reference.

In particular, the method S100 can modify an image and/or refresh the digital display within the computing device to reduce or limit perceived light scattering effects, perceived internal reflection of regions of the image, perceived refraction and/or diffraction of the image, perceived directional or preferential light transmission or emission through the substrate, perceived chromatic dispersion of light transmitted through the dynamic tactile layer, and/or other perceived optical distortions of parallax effects of the displayed image. The image rendered on the digital display may be modified based on the predicted user viewing position and the current position of the deformable region to reduce and/or minimize optical distortion of the image output by the digital display as perceived by the user. In some embodiments, portions of the graphical user interface may be linearly stretched about a predicted point of focus of the user on the digital display, a subregion of the image adjacent a deformable region may be translated based on an angle and distance of the user to the deformable region or to the digital display, and a subregion of the image adjacent the deformable region may be scaled to offset preferential magnification of the subregions of the image by the adjacent deformable region in the expanded setting.

Figure 7A:
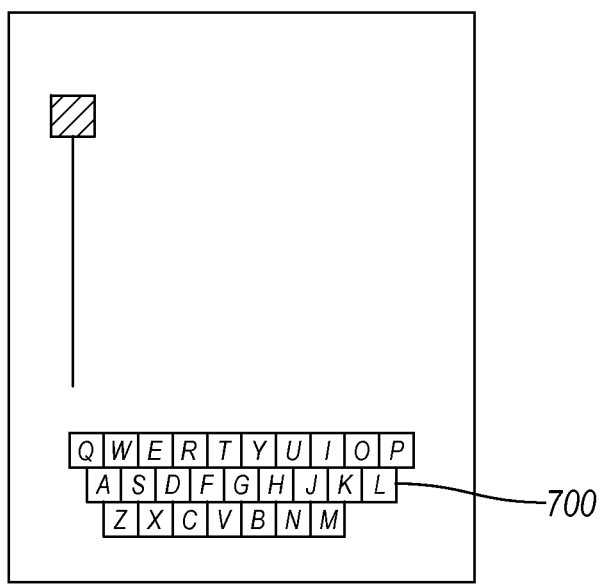
FIGS. 7A-B are schematic representations in accordance with one implementation of method S100.
Figure 7B:
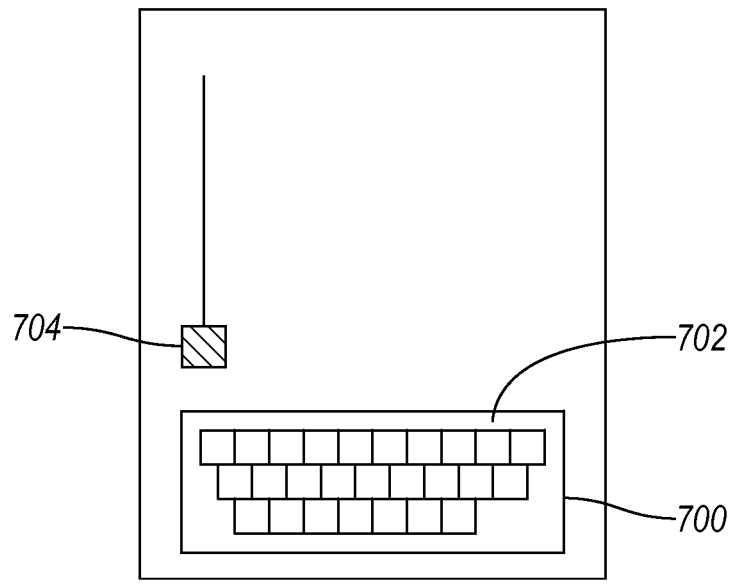

In some implementations, an image rendered on the digital display may include space between one or more keys of a keyboard, and the space between the keyboard may be a particular shade in contrast to the keys themselves, such as for example black shading. FIG. 7A illustrates a keyboard rendered on the display device without any image modification or compensation for refraction or distortion. In particular, the keys on the rendered keyboard 700 have no space between them. FIG. 7B illustrates a keyboard rendered on the display device after a slide 704 has been moved along a track to indicate the keyboard will be used with deformable regions. The keyboard 700 includes a modification for refraction and/or distortion. In particular, the keys on the rendered keyboard 700 have spacing 702 between them. In some implementations, black spacing on a graphical user interface that extends into the normal "button" graphical portion of the graphical user interface to reduce distortion. By providing spacing 702 between the keys on keyboard 700, the results of distortion or refraction caused by the raised deformable region can be reduced.

Figure 8A:
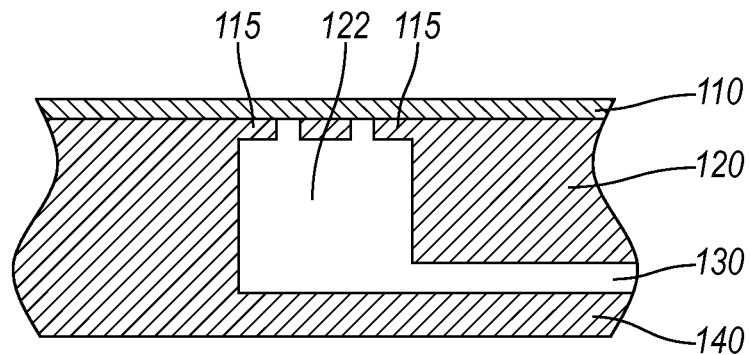
FIGS. 8A-C are schematic representations in accordance with one implementation of method S100.
Figure 8B:
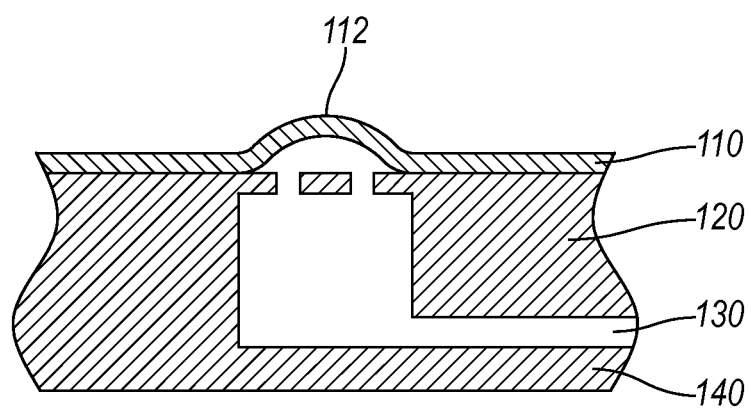
Figure 8C:
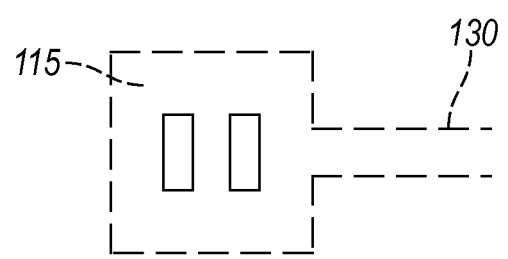

In some implementations, a support structure may be used to support a portion of the tactile layer and prevent accidently depressions of the tactile layer into the cavity 122. As shown in FIGS. 8A-C, the substrate 120 may include a support member 115 that extends over the cavity 122 and under the particular region of the tactile layer no. When the cavity 122 is expanded and the deformation is present at the deformable region 112, the support member 115 functions to prevent a user from "pressing too far" into the deformation below the plane of the tactile layer 110. When the cavity 122 is not expanded and the deformation is not present in the tactile layer 110, the support member 115 functions to reduce (or potentially eliminate) the user from feeling "divots" in the tactile layer no when swiping a finger across the tactile layer no. As shown in FIG. 8C, the support member 115 can include holes or channels that allow for the expansion of the cavity 115 and the deformation of the deformable region 112. The support member 115 can be integrally formed with the substrate 120, but may alternatively be formed with the tactile layer 110 or may be separately formed and later attached to the substrate 120. Finally, the support member 115 may alternatively partially define the cavity 115. The substrate 120 is preferably rigid, but may alternatively be flexible in one or more directions. The substrate 120—if located above a display—is preferably optically transparent, but may—if located below the display or if bundled without a display—be translucent or opaque. The substrate 120 can be made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 can be made of any suitable material that supports the tactile layer 110 and at least partially defines the cavity 122. In some implementations, the substrate 120 can be a single homogenous layer approximately 1 mm to 0.1 mm thick and is manufactured using well-known techniques for micro-fluid arrays to create one or more cavities and/or micro channels. In alternative versions, the substrate 120 can be constructed using multiple layers from the same material or from different suitable materials.

As a person skilled in the art will recognize from the previous detailed description and from the figures and the claims, modifications and changes can be made in the foregoing embodiments of the invention without departing from the scope of this invention as defined in the following claims.

We claim:

1. A dynamic tactile interface comprising:
   a substrate;
   a tactile layer defining a first region coupled to the substrate and a deformable region adjacent the peripheral region;
   the deformable region cooperating with the substrate to form a variable volume filled with a mass of fluid, the variable volume fluidly coupled to a fluid channel and transitioning from a retracted setting into an expanded setting in response to actuation of an input actuator, the deformable region substantially flush with the first region in the retracted setting and tactilely distinguishable from the first region in the expanded setting;
   a sensor detecting a change in a position of the input actuator and transmitting a signal in response to the change in position of the input actuator; and
   a processor in a display device coupled to the dynamic tactile interface, the processor processing the signal to generate an output.

2. The dynamic tactile interface of claim 1, further comprising a displacement device coupled to an actuator, the displacement device transitioning the deformable region from a retracted setting into an expanded setting.

3. The dynamic tactile interface of claim 2, wherein, in response to detecting the change in position of the input actuator, the volume of fluid is increased by the displacement device.

4. The dynamic tactile interface of claim 1, wherein the processor renders a graphical user interface to correlate to the change in position of the input actuator based on the signal.

5. The dynamic tactile interface of claim 1, the processor inferring the height of the deformable region from the sensor based on the signal.

6. The dynamic tactile interface of claim 1, further including a first bladder fluidly coupled to the variable volume, the variable volume of fluid modified in response to the input actuator adjusting the fluidic volume of the first bladder.

7. The dynamic tactile interface of claim 1, further including a second bladder, wherein the input actuator engages the first bladder at a first position and the second bladder at a second location.

8. The dynamic tactile interface of claim 1, wherein the input actuator moves along a track.

9. The dynamic tactile interface of claim 1, wherein the input actuator includes a dial.

10. The dynamic tactile interface of claim 1, wherein the dial causes one or more bladders to become compressed when the dial is rotated.

11. The dynamic tactile interface of claim 1, wherein the dial causes one or more valves to open or close when the dial is rotated.

12. The dynamic tactile interface of claim 1, wherein the processor renders a first graphical user interface in correlation with a first position of the input actuator and a second graphical user interface in correlation with a second position of the input actuator.

13. The dynamic tactile interface of claim 1, wherein the input actuator may travel in multiple directions.

14. The dynamic tactile interface of claim 1, wherein the rendered graphical interface includes a keyboard.

15. The dynamic tactile interface of claim 1, wherein the rendered graphical user interface is configured to reduce distortion caused by the deformable region in the expanded setting.

16. The dynamic tactile interface of claim 1, wherein, in response to the signal, the rendered graphical user interface is modified to be easier to perceive through the deformable region in the expanded setting.

17. The dynamic tactile interface of claim 15, wherein the rendered graphical user interface includes space between keys on a keyboard.

18. The dynamic tactile interface of claim 1, wherein the processor renders a first graphical interface that correlates with one or more deformable regions and the processor subsequently renders a second graphical interface that correlates with the one or more deformable regions.

19. The dynamic tactile interface of claim 1, wherein the dynamic tactile interface includes a second input actuator, the second input actuator, a second deformable region cooperating with the substrate to form a second variable volume filled with a second mass of fluid, the second variable volume fluidly coupled to a second fluid channel and transitioning from a retracted setting into an expanded setting in response to actuation of the second input actuator.

20. The dynamic tactile interface of claim 1, further including a support member, the support member extending from the substrate into the cavity and flush with the upper surface of the substrate.

21. The dynamic tactile interface of claim 20, wherein the support member forms one or more holes on the surface of the substrate.

22. The dynamic tactile interface of claim 1, wherein the input actuator engages a valve to allow fluid motion to or from a bladder.

23. The dynamic tactile interface of claim 22, wherein the input actuator includes a button that engages the valve.

24. The dynamic tactile interface of claim 22, wherein the input actuator includes a dial that engages the valve.

* * * * *